United States Patent [19]

Conner

[11] Patent Number: 4,518,507
[45] Date of Patent: May 21, 1985

[54] METHOD FOR CHEMICALLY SOLIDIFYING AND ENCAPSULATING HAZARDOUS WASTES IN ONE CONTINUOUS OPERATION

[75] Inventor: Jesse R. Conner, Atlanta, Ga.

[73] Assignee: Chem-Technics, Inc., Atlanta, Ga.

[21] Appl. No.: 531,750

[22] Filed: Sep. 13, 1983

[51] Int. Cl.³ .......................... C02F 1/52; C02F 11/14
[52] U.S. Cl. .................................... 210/747; 210/751; 53/576; 141/114; 141/313; 405/129
[58] Field of Search ................. 210/723-728, 210/730, 732, 747, 751; 405/128, 129; 106/74, 76, 77, 81, 84; 426/410, 413, 414; 53/171, 576, 581; 141/68, 10, 114, 313, 314, 317

[56] References Cited

U.S. PATENT DOCUMENTS

| | | | |
|---|---|---|---|
| 1,546,360 | 7/1925 | Bates | 141/10 |
| 2,260,064 | 10/1941 | Stokes | 426/410 |
| 2,292,231 | 8/1942 | LeSavoy | 53/576 |
| 3,466,841 | 9/1969 | Rausing | 426/410 |
| 3,650,298 | 3/1972 | Delmar | 53/576 |
| 3,721,060 | 3/1973 | Quinto | 53/576 |
| 3,763,621 | 10/1973 | Klein | 53/576 |
| 3,837,872 | 9/1974 | Conner | 210/751 |
| 3,908,336 | 9/1975 | Forslund | 53/576 |
| 3,938,300 | 2/1976 | Lovquist | 53/576 |
| 4,004,398 | 1/1977 | Larsson | 426/410 |
| 4,292,711 | 10/1981 | Becker | 53/576 |

FOREIGN PATENT DOCUMENTS

| | | | |
|---|---|---|---|
| 2359214 | 11/1972 | Fed. Rep. of Germany | 53/576 |
| 1312343 | 4/1973 | United Kingdom | 53/576 |
| 1427998 | 3/1976 | United Kingdom | 53/581 |

Primary Examiner—Ernest G. Therkorn
Attorney, Agent, or Firm—Jones & Askew

[57] ABSTRACT

A method of treating aqueous liquid and semi-liquid wastes to render them fit for ultimate disposal in a sedentary mass, by admixing with the waste a solidification agent, encapsulating the admixture before solidification in an elongate, pliable, tubular membrane, sealing the ends of the membrane, and allowing the admixture to set to a sedentary mass.

7 Claims, 6 Drawing Figures

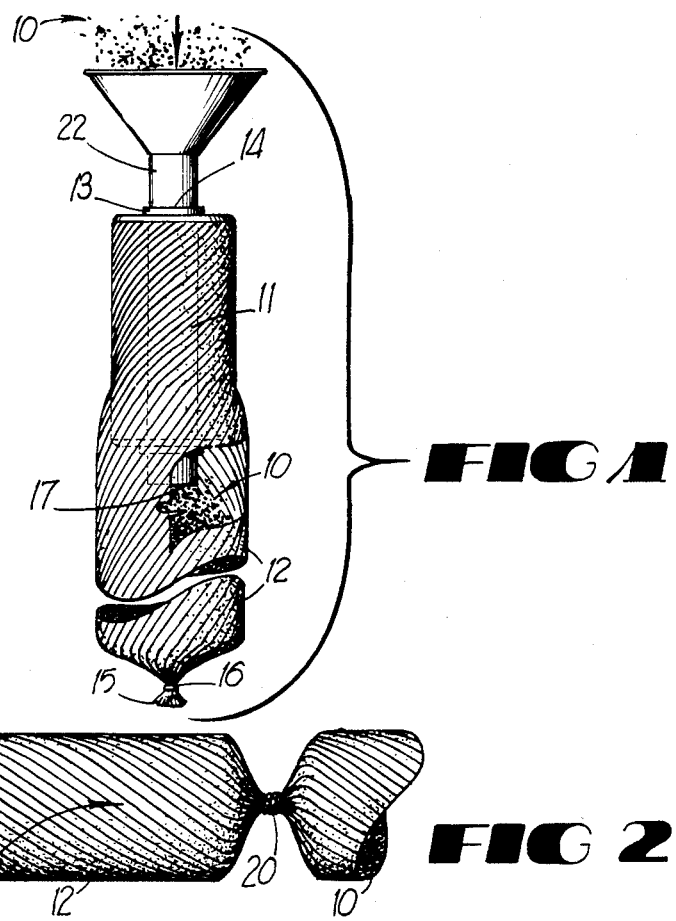
FIG 1
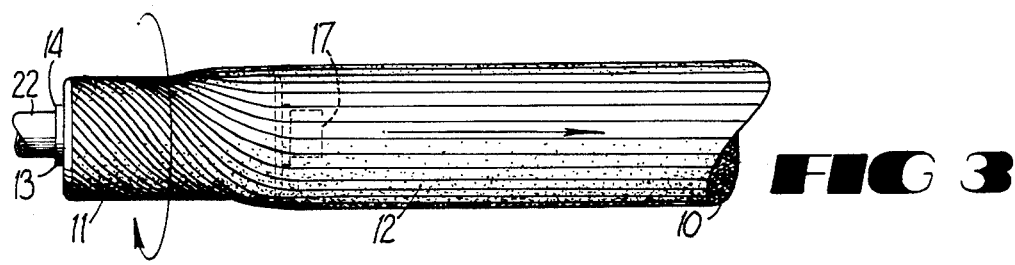
FIG 2
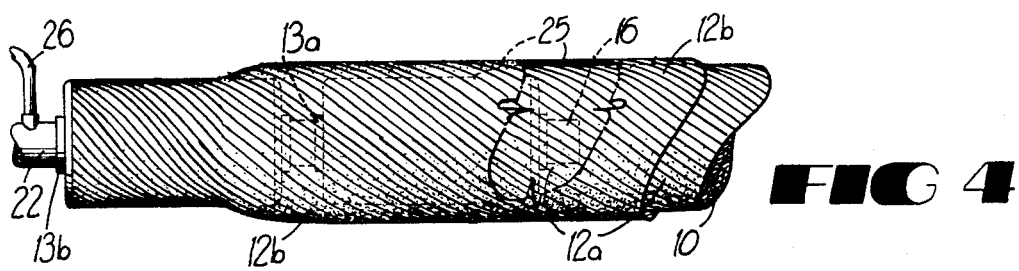
FIG 3
FIG 4

METHOD FOR CHEMICALLY SOLIDIFYING AND ENCAPSULATING HAZARDOUS WASTES IN ONE CONTINUOUS OPERATION

TECHNICAL FIELD

The present invention generally relates to waste treatment, and specifically relates to a method for the solidification and encapsulation of aqueous liquid and semi-liquid waste sludges and slurries in a continuous elongate, pliable, tubular membrane.

BACKGROUND

Chemical fixation and solidification processes have found recent favor for detoxifying hazardous waste materials and for producing solid waste having physical properties suitable for ultimate disposal in landfills, ocean dumping, and the like. Part of the impetus for developing new methods of chemical fixation and solidification has arisen from the hazardous waste control program called for under the Resource Conservation and Recovery Act of 1976 (RCRA), Public Law 94-580, which charges the United States Environmental Protection Agency with the responsibility for implementing and supervising the hazardous waste control program. Under that program, promulgated in 1980, a series of regulations issued which required that certain sludges, slurries and other liquid wastes containing specified hazardous materials may no longer be deposited in landfills without pre-treatment, stabilization, and dewatering. Wastes must additionally have acceptable toxicity levels as measured by certain established tests before they can be discarded in a landfill.

One primary objective of these governmental regulations is to achieve a non-flowing consistency of the wastes by reduction of the liquid content or increase of the solid content to eliminate the presence of free liquids prior to final disposal and a landfill.

Various waste solidification methods are known in the art. For example, U.S. Pat. No. 3,837,872 discloses a method for treating liquid wastes by adding an aqueous solution of an alkali metal silicate and a silicate setting agent, which converts the waste into a chemically and physically stable solid product. The patent to Thomson, U.S. Pat. No. 3,980,558, discloses a method for treating liquid wastes by adding a solidification agent consisting essentially of hydraulic cement. Abandoned application Ser. No. 510,152 of the present applicant discloses a method for treating aqueous liquid and semi-liquid wastes by solidification by mixing the waste with a dry water-reactive solidification agent comprising cement, a dry water absorbent material, and a powdered alkali metal silicate to convert the admixture into a chemically and physically stable end product which contains virtually no free-standing water.

If a particular waste cannot be detoxified even though solidified, it requires disposal in a secure landfill where landfill liners and leachate collection systems protect the groundwater in the vicinity of the landfill from contamination by the wastes. The efficacy of such landfill liners and leachate collection systems is enhanced if the wastes are encapsulated during or immediately after treatment and prior to disposal in the landfill, since encapsulated wastes are less likely to release hazardous substances into the groundwater. In some cases, encapsulation is accomplished by pouring the wastes while still liquid into an impermeable plastic bag or other similar disposable container which holds the waste while solidification is occurring. The waste is then transported in the containers to the landfill where the waste and container are buried.

There are several advantages to containerizing wastes in addition to the improvement in the operation of secure landfills. For example, if a waste has an offensive odor, even when the waste has been detoxified the handling, transportion, and disposal of the waste becomes a problem. Containerizing or encapsulating such wastes in plastic or other similar impermeable material minimizes problems due to odor and in many cases completely prevents odors from occurring.

Encapsulated or containerized wastes provide the additional advantage that such containerized wastes present a better appearance to neighbors of a landfill and therefore help prevent problems with public acceptance. Moreover, for wastes which even when solidified are not sufficiently detoxified to allow disposal in a nonsecure landfill, the encapsulation or packaging of the waste in an impermeable container provides an extra level of safety by assisting in the prevention of the formation of toxic leachate from the wastes in a secure landfill.

Even when wastes are solidified, wastes can sometimes produce dust particles which can separate from the solidified wastes during transportion, as for example when solidified wastes are carried in a dump truck. Accordingly, environmental regulations require a plastic liner for sealing the top of the truck. Certain types of waste which are particularly noxious require seals over transportation containers even if the waste does not produce dust particles when transported. Containerizing these wastes would meet these environmental requirements as a matter of course.

When a waste is in a liquid or semi-liquid form and is to be treated by solidification, it is usually necessary to place the waste in some form of container while it hardens. Various types of containers have been developed for use in the waste solidification industry and generally are inexpensive and readily available. A problem sometimes arises however in removing the solidified wastes from the containers for transportion and landfilling. Plastic liners have been proposed for the waste solidification containers so that the wastes will be easily removable after solidification. Sometimes, these liners do not work as well as would be liked because of the fact that the solidifed waste is a large, monolithic block and the containers are typically of unitary construction and frictionally resist removal of the block. Casting the waste into smaller containers for transportation to the disposal site has been demonstrated to work better than casting into a large block, but it is inefficient and expensive since it increases the cost of containerizing per unit volume of waste disposed of. Additionally, large monolithic waste blocks are sometimes difficult to handle with conventional landfill operating equipment because of the hardness of the waste.

Accordingly, there has long been a need for an efficient and effective method for containerizing or encapsulating toxic and nontoxic liquid and semi-liquid wastes which are treated by solidification.

SUMMARY OF THE INVENTION

Briefly described, the present invention provides a method for treating and encapsulating in a continuous process aqueous liquid and semi-liquid wastes to render them fit for ultimate disposal in a sedentary mass. The preferred method comprises mixing the waste with a solidification agent, and prior to the solidification of the admixture, encapsulating the admixture in a continuous, elongate, pliable, tubular membrane which is fed out from a radially wound core as the membrane is filled with the solidification admixture. The end of the tubular membrane is sealed off prior to filling with the admixture, so that as the waste admixture is forced into the membrane, the membrane unwinds from the core and produces a solid continuous cylinder of encapsulated waste. After the membrane is filled, the membrane is sealed at the end, producing an elongate solid cylinder of waste material confined within the membrane, which is allowed to set to a sedentary mass.

In the preferred method, the membrane is radially wound on a hollow cylindrical core, so that the admixture of waste and solidification agent is pumped or otherwise forced into the hollow core and thence into the membrane. The membrane then unwinds from the core as the membrane is filled to produce the solid cylinder of admixture. The membrane can be closed by tying off at periodic intervals along the length of the filled membrane to create a series of individual waste-filled segments which somewhat bear a resemblance to link sausages. These individual waste-filled segments can be separated to form discrete packages for transportation and disposal.

Preferably, the encapsulating membrane is a water impervious material such as polyethylene, styrene, and the like, although other waterproof pliable materials can also be used.

Accordingly, it is an object of the present invention to provide an improved method for treating and containerizing aqueous liquid and semi-liquid wastes to render them fit for ultimate disposal in a sedentary mass.

It is a further object of the present invention to provide a method for treating aqueous liquid and semi-liquid wastes for solidification by encapsulating the wastes in a continuous water-impervious container.

It is a further object of the present invention to provide a method for treating liquid and semi-liquid wastes which are to be solidified by a continuous encapsulation process not dependent on a container having a predetermined size.

It is another object of the present invention to provide an improved method for treating aqueous liquid and semi-liquid wastes to be solidified by providing a continuous encapsulation process in which individual waste-fill container segments may be created and then separated for transportation and disposal.

It is a further object of the present invention to provide a method for containerizing aqueous liquid and semi-liquid wastes which are to be solidified by encapsulating the waste in a continuous flexible container which can be filled at the ultimate disposal site with a mixture of the waste and a solidification agent and which thereafter solidifies with the container without the need for further processing.

It is a further object of the present invention to provide a method for treating aqueous liquid and semi-liquid wastes to be solidified by encapsulation in a continuous yet pliable package which can be arranged in a landfill disposal site to fit the geometric characteristics of the landfill.

These and other objects, features, and advantages of the present invention may be more clearly understood and appreciated from a review of the following detailed description of the disclosed embodiments and by reference to the appended drawings and claims.

BRIEF DESCRIPTION OF THE DRAWINGS

FIG. 1 illustrates a radially wound core of membrane and the introduction of the waste product into the core to fill the membrane, according to a preferred embodiment of the invention.

FIG. 2 illustrates the formation of discrete packages of waste, according to the preferred embodiment.

FIG. 3 illustrates the formation of a continuous elongate waste filled membrane, according to the preferred embodiment.

FIG. 4 illustrates the encapsulation of waste by two concentric tubular membranes, according to a modified embodiment of the invention.

DETAILED DESCRIPTION OF THE PREFERRED EMBODIMENT

Figure 5:
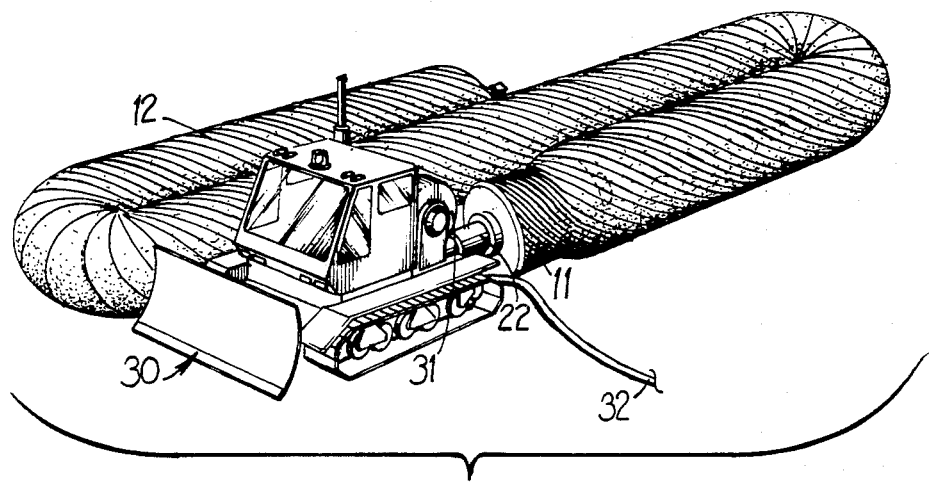
FIG. 5 illustrates a large diameter membrane tubing being filled on-site in a landfill, according to an application of the present invention.

Referring now to the drawings, in which like numerals indicate like elements throughout the several views, FIG. 1 illustrates the method of the preferred embodiment wherein a continuous tubular membrane 12 is filled with an admixture 10 of solidification agent and waste. A supply 11 of the membrane 12 is radially wound on a cylindrical core carrier 13, through the center of which the admixture 10 of waste and solidification agent is introduced at a first core end 14. The first end 15 of the membrane 12 provided from the supply 11 is closed with closure means 16 such as a metal band, tie, or the like, so that the membrane 12 will retain therein the material introduced through the first end 14 of the core carrier.

The admixture 10 of waste and solidification agent exits the core 13 at a second core end 17 and into the membrane 12. By forcing the admixture into the core by pumping or the like and thus into the membrane 12, as the membrane 12 fills, the membrane will feed from the supply 11 on the core 13 to form a continuously filled tube of waste.

Preferably, the membrane is a polyethylene or styrene continuous plastic membrane which can be compactly and radially wound on the carrier core 13 in a spiral fashion. It will also be understood that other types of a radially wound membrane including waterproof paper are also expressly considered to be within the scope of the present invention.

The preferred embodiment contemplates the encapsulation of an admixture of waste and solidification agent which sets to a sedentary mass with the closed environment of the tubular membrane. Those skilled in the art will understand that solidification does not, by itself, affect the hazard potential of the waste. Solidification however reduces the hazard potential of the waste by creating a barrier between the waste particles and the environment, by limiting the permeability of the solidified waste to water, or by reducing the affected surface area of the waste available for diffusion by surface water. Accordingly, the term "solidification" is not limited to processes which produce a rock-like solid, but also encompasses the transformation of waste into any solid physical form which is more suitable for long term storage, burial, transportation, ocean disposal or re-use in processes such as highway paving. For example, friable solid wastes may be considered "solidified."

A "solidification agent" is any chemical compound or combination of compounds which produces solidification in a given waste. For example, in my co-pending application Ser. No. 510,152, which is incorporated herein by reference, there is described a method for solidification of waste comprising the steps of mixing with the waste a dry water-reactive solidification agent comprising cement, a dry water absorbent material, and a powered alkali metal silicate in a quantity sufficient to convert the mixture into a chemically and physically stable solid end product substantially insoluble in water and which contains substantially no free-standing water. My U.S. Pat. No. 3,837,872 also discloses a solidification method wherein a solidification agent comprising an aqueous solution of an alkali metal silicate and a silicate setting agent is added to a liquid waste, thereby converting the waste into a stable solid product. The product to Thompson, U.S. Pat. No. 3,980,558 discloses a method for treating liquid waste by adding a solidification agent consisting essentially of hydraulic cement.

In general, any solidification method or system which is operative to convert the admixture of the waste and the solidification agent into a stable end product within a closed environment may be used in the present invention. In particular, methods which employ the cement-soluble silicate solidification technology are considered preferable for use in the present invention. Solidification methods which employ the two-part cement-soluble silicate solidification technology described in my U.S. Pat. No. 3,837,872, and methods which employ modifications thereof, are also considered useful in the present invention. For example, French Pat. No. 1,246,848 discloses a method of treating radioactive waste by adding cement along or in combination with sodium silicate to convert the waste into a chemically and physically stable solid. U.S. Pat. No. 4,173,546 discloses the use of the cement-soluble silicate solidification technology with the addition of powdered shale to fix cesium isotopes. Similarly, U.S. Pat. No. 3,988,258 discloses a method for processing radioactive wastes using a cement and a soluble silicate to cause hardening in a storage and shipping container.

Cement-based solidification technologies are also usable in the present invention. For example, U.S. Pat. Nos. 4,116,705, 4,230,568, 3,980,558, 3,947,284, 3,947,283, 4,142,912, 4,020,003, 4,149,968, 4,113,504, 4,122,028, 4,174,293, and 4,132,558 are considered solidification technologies operative for use in the present invention.

These and other similar solidification technologies which permit solidification to occur upon the admixture of a solidification agent to the waste are considered usable with the present invention.

The preferable method for dispensing the tubular membrane comprises unwinding the membrane from the core carrier 13. Depending upon whether the core carrier 13 is allowed to rotate or is locked in place during the filling of the membrane, the filled tubular membrane will be either straight and the solid waste continuous, as illustrated in FIG. 3, or alternatively spiral and segmented somewhat like sausage links, as illustrated in FIG. 2. If as illustrated in FIG. 2 the core carrier 13 is held immobile as the waste is pumped into the first end 14 of the core, the membrane 12 will spiral as it unravels from the core 13.

By placing additional twists in the spiral as at 20, a series of individual waste-filled segments of encapsulated admixture can be created. By tying off and separating these waste-filled segments by cutting the membrane between two adjacent ties, discrete segmented packages of encapsulated waste mixture can be created for transporting the waste. These segments can be sealed from each other by application of clips, ties, or heat fusing. In some applications, such a configuration is the most desirable one as, for example, where it is desired to transport the waste via a vehicle prior to ultimate disposal.

It will be appreciated that the discrete segments of waste can be made any size desired, to facilitate handling, storage, transportation, and the like, and that each of the discrete segments comprises a separate sealed "container" possessing all the advantages of containerization.

If on the other hand a continuous non-segmented package is desired, as illustrated in FIG. 3, by allowing the core carrier 13 to rotate with respect to a filling tube 22, the spiral of the membrane 12 created when the membrane was wound on the core carrier will be allowed to unravel as the membrane fills, thereby resulting in a continuous, nonspiral filled membrane.

It is further contemplated that two or more plies of membranes can be combined concentrically, as shown in FIG. 4. A first core carrier 13a is mounted on a filling tube 22 axially adjacent to a second core carrier 13b, and is disposed closest to the discharge or second core end 17 of the filling tube 22. The membrane 12b from the second core carrier 13b is placed over the membrane 12a carried by the first core carrier 13a. Thus, the first membrane 12a will be concentrically confined within and encapsulated by the second membrane 12b. It will be appreciated that a space 25 will exist between the first membrane and the second membrane 12b. This space 25 can be filled through a filling inlet port 26 with a second waste material or with a layer of buffer material should the application require same.

FIG. 5 illustrates a large tubular membrane 12 being filled with a waste at the site of a landfill by a tractor 30 adapted to carry a pump 31 for filling the membrane. The tractor further carries the filling tube 22 which is connected to the pump 31 and receives the mixture of waste and solidification agent through an inlet 32. The core carrier 13 is mounted to receive the mixture through a filling tube 22 substantially as shown in FIG. 1.

Figure 6:
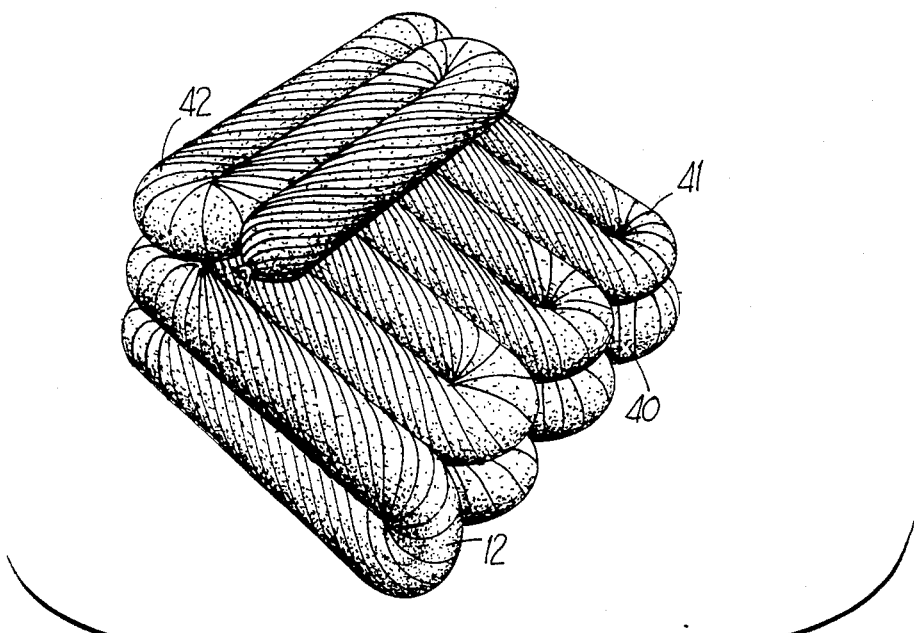
FIG. 6 illustrates the criss-crossed deployment of filled tubing which permits water percolation, according to an application of the present invention.

Also, FIG. 5 illustrates a preferred method of laying the filled continuous encapsulated tubular waste membrane in a generally S-shaped pattern in the landfill to obtain the maximum use of the available space. As shown in FIG. 6, additional layers of encapsulated tubular waste can be laid atop other layers so as to create multiple layers of solidified waste. In FIG. 6, a lower or first layer 40 may be laid at the bottom of the 1andfill, covered by a second layer 41, followed by a third layer 42, all laid in a generally S-shaped pattern to maximum use of the available space. If If layers are stacked as shown in FIG. 6, excessive pressure on the membrane might cause the membrane to break, permitting introduction of ground water and allowing possible leaching or soil contamination. Preferably, adjacent layers of filled membranes should be criss-crossed with respect to each other, that is, the lengths of one layer should be placed substantially orthogonally to the lengths of the adjacent layer. Advantageously, criss-crossing layers of the filled tubed membrane permits water to percolate between layers of filled tubes, and especially between adjacent continuous lengths of filled tube, thereby relieving ground water pressure upon the tube. This prolongs the life of the membrane and thereby helps prevent leaching of the waste contained within the membrane.

A specific example of the use of the present invention is in the case of the solidification and disposal of sewage sludge. This particular type of waste, as produced from primary sewage treatment plants, is generally quite odoriferous and very offensive, even when the sludge has been rendered essentially non-hazardous chemically. The unpleasant odor of the sludge plus the presence of disease-causing microorganisms precludes disposal of such sludges in sanitary landfills even after solidification due to the possibility that ground water can leach the microorganisms from the solidified waste. Additionally, since the waste must harden at the treatment plant before being transported, the problem of unpleasant odor remains during the setting time of the waste unless the waste is completely sealed off from the environment.

Use of the present invention for the treatment of sewage sludge is highly desirable and cost effective. Based on currently available materials as of the date of filing hereof, it is estimated that one foot diameter polyethylene membrane, having a thickness of five mils, will cost in the range of $0.01 to $0.02 per gallon of waste to be solidified. Other than the cost of the materials and pumping the waste into the core carrier, the operational cost is negligible. It is believed that a net cost savings may occur since use of the method of the present invention obviates the need for container liners and covers for the wastes during setting and transportation. It is estimated that including the cost of the solidification agent the cost of treatment of sewage sludge will range from $0.15 to $0.50 per gallon of waste treated based on 1983 prices, with the cost of continuous encapsulation as disclosed herein representing approximately five to ten percent of the total cost of solidification, encapsulation, and ultimate disposal of the waste.

It will now be appreciated that there has been described a method of treating aqueous liquid and semi-liquid wastes to render them fit for ultimate disposal in a sedentary mass, which method includes the steps of mixing with the waste a solidification agent, encapsulating the admixture before solidification in an elongate, pliable, quasi cylindrical tubular membrane, sealing the ends of the membrane, and then allowing the admixture to set to a sedentary mass. It will be further understood that the present invention has disclosed that the membrane can be periodically closed along the length of the membrane to create a series of individual waste-filled segments for transportation or for disposal, which individual segments can be separated to form discrete packages.

It will be further understood that the method taught herein can be employed to lay the continuous encapsulated waste membrane package in a generally S-shaped pattern in a landfill in order to maximize use of available disposal space. It will be further understood that additional lengths of continuous encapsulated waste membranes can be laid atop other layers of encapsulated waste in the landfill, thereby permitting ground water to percolate between layers and reducing the ground water pressure upon the encapsulated waste, thereby prolonging the life expentancy of the encapsulating membrane.

It will be further understood that there has been disclosed an apparatus for treating such aqueous liquid and semi-liquid wastes to render them fit for ultimate disposal in a sedentary mass, including means for mixing with the waste a solidification agent, an elongate quasi cylindrical tubular membrane for receiving the admixture prior to the solidification thereof, the membrane being radially wound on a storage cylinder, the membrane being closed at one end to receive and retain a quantity of the solidifying admixture, and pumping means for transferring the admixture prior to solidification from the mixing means and introducing the admixture into one end of the membrane storage cylinder so that the membrane is continually removed from the other end of the storage cylinder to form an elongate tubular sheath about the solidifying admixture.

Finally, it will be understood that the preferred embodiment of the present invention has been disclosed by way of example and that other modifications may occur to those skilled in the art without departing from the scope and spirit of the appended claims.

I claim:

1. A method of treating aqueous liquid and semi-liquid wastes to render them fit for ultimate disposal in a sedentary mass in a landfill or other ultimate disposal site, comprising the steps of:
   admixing with the waste a solidification agent in a location proximate an ultimate disposal site;
   providing at the ultimate disposal site a mobile carrier means for receiving the admixture of waste and solidification agent and for disposing of the admixture at the disposal site;
   feeding the admixture prior to the solidification thereof axially into the hollow cylindrical core of a supply of elongate pliable, continuous tubular membrane mounted on the mobile carrier means to fill the membrane;
   dispensing the membrane from the core as the membrane is filled to produce a continuous length of filled membrane;
   disposing the filled membrane from the mobile carrier means along a path at the disposal site;
   sealing the ends of the membrane; and
   allowing the admixture to set to a sedentary mass at the disposal site.

2. The method of claim 1, wherein the steps of the method are performed on-site in a landfill, and further comprising the step of laying the continous filled membrane in a first generally S-shaped path in the landfill.

3. The method of claim 2, further comprising the step of layering an additional length of continuous filled membrane in a second generally S-shaped path atop of and horizontally adjacent to said first generally S-shaped path whereby when the layers are covered in the landfill, groundwater in the landfill can seep downwardly between the layers.

4. The method of claim 1, further comprising the step of concentrically encapsulating the admixture and the tubular membrane in a second elongate pliable tubular membrane.

5. The method of claim 1, further comprising the step of providing a water impervious tubular membrane for encapsulation of the admixture.

6. The method of claim 5, wherein said water impervious membrane is selected from the group consisting of polyethylene, polyvinyl chloride, styrene, and waterproof paper.

7. The method of claim 1, wherein the step of admixing with the waste a solidification agent comprises admixing a solidification agent which sets to a sedentary mass in a closed environment.

* * * * *